(12) United States Patent
Wang et al.

(10) Patent No.: US 6,379,725 B1
(45) Date of Patent: *Apr. 30, 2002

(54) PROTEIN-BASED CHEWABLE PET TOY

(75) Inventors: Shu Huan Wang, Plano; Cheng-Wen Chen, Richardson, both of TX (US)

(73) Assignee: Natural Polymer International Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,659

(22) Filed: Sep. 2, 1998

Related U.S. Application Data (63) Continuation-in-part of application No. 09/072,857, filed on May 5, 1998, now Pat. No. 5,922,379.

(51) Int. Cl.[7] .............................. A23J 3/04; A23J 3/14; A23K 1/18
(52) U.S. Cl. ............................. 426/72; 426/73; 426/74; 426/104; 426/656; 426/657; 426/805
(58) Field of Search ......................... 426/104, 98, 623, 426/573, 656, 657, 805, 72, 73, 74

(56) References Cited

U.S. PATENT DOCUMENTS

| | | | |
|---|---|---|---|
| 3,871,334 A | | 3/1975 | Axelrod ..................... 119/29.5 |
| 3,950,545 A | * | 4/1976 | Hayward et al. ............. 426/72 |
| 4,045,585 A | * | 8/1977 | Appleman et al. .......... 426/331 |
| 4,310,558 A | | 1/1982 | Nahm, Jr. .................... 426/98 |
| 4,419,372 A | * | 12/1983 | Greene et al. .............. 426/104 |
| 4,513,014 A | | 4/1985 | Edwards ..................... 426/132 |
| 4,557,219 A | | 12/1985 | Edwards ..................... 119/29.5 |
| 4,674,444 A | | 6/1987 | Axelrod ..................... 119/29.5 |
| 4,771,733 A | | 9/1988 | Axelrod ..................... 119/29.5 |
| 4,892,748 A | * | 1/1990 | Andersen et al. ........... 426/635 |
| 4,928,632 A | | 5/1990 | Gordon ...................... 119/29.5 |
| 5,011,679 A | * | 4/1991 | Spanier et al. ................ 424/57 |
| 5,200,212 A | | 4/1993 | Axelrod .......................... 426/2 |
| 5,240,720 A | | 8/1993 | Axelrod .......................... 426/2 |
| 5,339,771 A | | 8/1994 | Axelrod ....................... 119/710 |
| 5,397,834 A | * | 3/1995 | Jane et al. .................. 525/54.1 |
| 5,419,283 A | | 5/1995 | Leo ............................. 119/709 |
| 5,476,069 A | | 12/1995 | Axelrod ...................... 119/709 |
| 5,501,868 A | | 3/1996 | Collings et al. ............. 426/623 |
| 5,523,293 A | * | 6/1996 | Jane et al. ..................... 514/21 |
| 5,773,070 A | | 6/1998 | Kazemzadeh ............... 426/573 |
| 5,832,877 A | | 11/1998 | Markham ................... 119/710 |
| 5,865,146 A | | 2/1999 | Markham ................... 119/707 |
| 5,894,029 A | | 4/1999 | Brown et al. ................ 426/302 |
| 5,941,197 A | | 8/1999 | Axelrod ...................... 119/710 |
| 5,947,061 A | | 9/1999 | Markham et al. ........... 119/170 |

OTHER PUBLICATIONS

Moran, V., Guilt–Free Frozen Desserts., Nutrition Health Review, N. 55, p. 15, 1990.*
Institutional Distribution, Dairy Products, Food Product Savy, Special Issue, V. 25, N. 6, p. 172 (4), 1989.*

\* cited by examiner

*Primary Examiner*—Arthur L. Corbin
(74) *Attorney, Agent, or Firm*—Madson & Metcalf (57) ABSTRACT

Protein-based, edible chewable pet toys, such as artificial dog bones, and methods of preparing such chewable pet toys are disclosed. The chewable pet toys are made from protein-based thermoplastic composition containing plant and animal derived proteinic material and various additive and nutrient ingredients. Chewable pet toys within the scope of the present invention possess properties of conventional artificial dog bones made of synthetic polymer, such as good strength and hardness, but they are biodegradable and edible. In addition, the chewable pet toys contain vitamins, minerals, flavorings, oral hygiene additives and other ingredients to help keep teeth and bones strong and to promote the growth and health of the pet.

23 Claims, 2 Drawing Sheets

PROTEIN-BASED CHEWABLE PET TOY

This application is a continuation-in-part of application Ser. No. 09/072,857, filed May 5, 1998, now U.S. Pat. No. 5,922,379.

FIELD OF THE INVENTION

The present invention relates to protein-based, nutritious and multifunctional artificial dog bones and chewable pet toys. The present invention also relates to methods of preparing such chewable pet toys and dog bones.

BACKGROUND

For many people, dogs and other pet animals play an important role in providing happiness and safety in the family environment. People are becoming more concerned about the health and hygiene of their dog or pet. Chewable toys and artificial dog bones are commonly used to help massage the gums and to strengthen and clean the teeth of the dog or pet. As the animal expends chewing energy on the artificial bone or chewable pet toy, the animal is also less inclined to destructively chew on household objects.

There are several artificial dog bones or chewable pet toys currently marketed. The FLEXIBONE Nylon Chew, disclosed in U.S. Pat. No. 5,339,771, is made of molded synthetic thermoplastic having animal meal dispersed in the plastic polymer. This dog chew is strong and causes no tooth wear which can occur with natural bones, but it is not edible. Because the synthetic polymer is not biodegradable, it can potentially harm the environment.

Another commercially available artificial dog bone or pet chew is made of corn starch-based material with inert materials, such as "OL'ROY Dog Chews" marketed by Wal-Mart Stores, Inc. Yet another pet chew product, sold as BOODA VELVETS dog chews, is made of a natural corn starch vinyl-alcohol copolymer, as disclosed in U.S. Pat. No. 5,419,283. The OL'ROY and BOODA VELVETS dog chews are not useful edible products in that they lack nutritional value. They do not replace or supplement the dog's regular required diet or nutrition.

Many artificial dog bones are made of beef hides or pigskin. Examples of such artificial dog bones include HARPER'S CHEWBLER BONE made from beef hides and NATURAL BONES RAWHIDE CHEW TREATS produced by Pet Expo. These products possess a natural flavor, but they lack nutritional content. Moreover, artificial chewing toys made of rawhide are usually quickly destroyed by the chewing action which breaks down the structure of the material.

In all cases, care must be exercised when the dog is an aggressive chewer and is capable of breaking off an unusually large piece of the artificial dog bone or dog chew.

It will be appreciated that there is a need in the art for artificial dog bones and chewable pet toys which are durable, strong, improve oral hygiene, and provide nutritional value to the dog or pet.

Such artificial dog bones and chewable pet toys are disclosed and claimed herein.

SUMMARY OF THE INVENTION

The present invention is directed to edible chewable pet toys, such as artificial dog bones, and to methods of preparing such chewable pet toys. The chewable pet toys within the scope of the present invention are preferably made from protein-based thermoplastic composition containing plant and animal derived proteinic material and various additive and nutrient ingredients. Chewable pet toys within the scope of the present possess properties of conventional artificial dog bones made of synthetic polymer, such as good strength and hardness. In addition, the chewable pet toys contain nutrients and other ingredients to help keep teeth and bones strong and to promote the growth and health of the pet.

The edible and chewable pet toys within the scope of the present invention are preferably prepared from protein-based thermoplastics. The protein-based thermoplastic composition is made from plant protein, such as soy protein isolate, soy protein concentrate, gluten (such as wheat, oat, or rice gluten), corn zein, hordein, avenin, kafirin, or a combination thereof, alone or combined with animal protein, such as collagen, casein, albumin, gelatin, keratin, natural beef hides, pigskins, or chicken skins.

The protein can be a native protein or a chemically modified protein. Native protein is unmodified protein. Chemically modified protein includes hydrolyzed protein which provides better processing flowability. In order to improve water resistance of the protein, an organic acid can be used to adjust the pH of the protein composition to a pH between 4.5 and 6.5. Typical organic acids include lactic acid, malic acid, citric acid, tartaric acid, acetic acid, succinic acid, etc. Chemically modified proteins also include proteins treated with anhydrides.

The protein-based thermoplastic composition also preferably contains various nutrient ingredients to keep bones strong and to promote the growth and health of dogs and pets. Such nutrient ingredients can include vitamins, minerals, crude and dietary fibers, dried meat floss, and flavorings. Typical flavorings include beef, pork, and chicken flavors commonly preferred by dogs and pets. The other additives, such as anti-tartar agents and fresheners can be used to help clean teeth and promote good oral hygiene.

Processing aids, such as plasticizers, can be used to improve flowability of protein-based molding composition. Preservatives can also be used to maintain the freshness and edible character of articles prepared from the protein-based thermoplastic composition.

The present protein-based molding composition has good processing flowability, excellent mechanical properties such as a tensile strength from about 20 to 40 MPa and a Young's Modulus from about 800 to 4000 MPa, and good water resistance with water absorption between about 80 to 250 wt. %.

Figure 1:
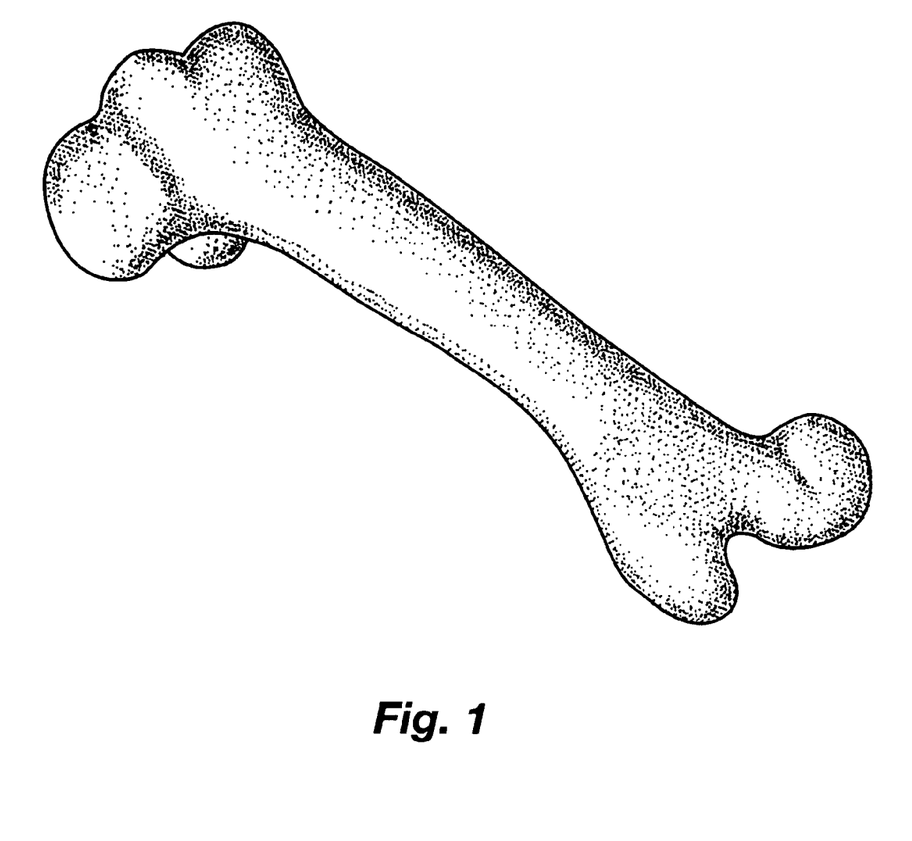
FIG. 1 is a perspective view of a typical animal bone shape of a molded dog chew toy formed in accordance with the present invention.

In the present invention the protein-based thermoplastic composition can be easily shaped by injection molding, compression molding, transfer molding, pressure forming, or other similar molding methods. The present invention is preferably molded or shaped into the form of a chewable pet toy or into a configuration mimicking a natural animal bone, such as the molded bone shape shown in FIG. 1.

DESCRIPTION OF THE INVENTION

The present invention is directed to edible chewable pet toys, including artificial dog bones, and to methods of preparing such articles. The artificial dog bones and pet toys are made of a protein-based thermoplastic composition prepared by combining plant protein, animal protein, various nutrients, reinforcing fibers, hygiene additives, preservatives, water, processing aids, flavorings, coloring agents, and/or modifiers.

The protein-based thermoplastic compositions have good processing flowability and excellent mechanical properties when molded into articles. The compositions are useful in molding articles of various shapes, dimension and sizes, such as chewable pet toys and other articles made to mimic natural animal bone shapes.

Dogs and pet animals require protein. Proteins form the enzymes that metabolize food into energy as well as the hormones that guide various body function. The protein-based thermoplastic composition within the scope of the present invention preferably contains a high amount, above about 70 to 80 wt. %, of protein. Molded articles prepared from the protein-based thermoplastic compositions have excellent mechanical properties, structure stability, and water resistance. The texture, pliancy, and consistency of the molded articles encourage gnawing, making them a pure delight for dogs and pet animals. The gnawing action allows pets to softly penetrate the chewable pet toy, promoting clean, healthy teeth and fresh breath.

The protein-based composition is formulated with a plant protein, such as soybean protein, alone or combined with a other plant or animal derived proteins and/or microorganisms. Such microorganisms can include baker's yeast or beer yeast. The plant derived proteins that are suitable for use in the present composition include soybean protein (such as soy protein isolate and soy protein concentrate), gluten (such as wheat, oat, or rice gluten), corn zein, hordein, avenin, kafirin, or a combination thereof. Animal derived proteins that are suitable for use in the present composition include casein, albumin, collagen, gelatin, and keratin.

Soybean protein is commercially available as soy protein isolate, containing at least 90% protein, and soy protein concentrate, containing at least about 65 to 70% protein. Soy protein is commercially available from various suppliers such as Central Soya Co. Inc., Fort Wayne, Ind.; Archer Daniels Midland Company, Decatur, Ill.; Protein Technologies International, St. Louis, Mo.

The nutrient ingredients of the protein-based molding composition can include vitamins and minerals. Nutrients are preferably included in the protein-based thermoplastic composition to render articles molded therefrom nutritious. Vitamins and minerals are necessary for proper absorption of fats and carbohydrates and for the chemical reactions in the body. All pet animals need vitamins and minerals in proper amounts and ratios for optimum health. Currently preferred vitamin ingredients include vitamin $B_1$, $B_2$, $B_3$, $B_{12}$, vitamin C, vitamin E, vitamin D, niacin (vitamin PP), biotin (vitamin H), menadione (vitamin K), folic acid (vitamin B,), pyridoxine ($B_6$), and vitamin A.

Minerals are essential for bone formation, muscle metabolism, fluid balance, and nervous system function. Minerals are present in living animals in either major or trace concentrations. Although dietary requirements of trace elements are minimal, they are essential to general good health too. Minerals which can be included in major concentrations are calcium, potassium, magnesium, and sodium. Minerals which can be included in trace concentrations are iron, phosphorus, zinc, manganese, iodine, selenium, and cobalt.

The reinforcing fibers used in the protein-based compositions of the present invention can include natural crude cellulosic fibers and dietary fibers. The fibers can improve physical properties of molded articles, such as tensile strength, compression strength, rigidity modulus, reduce shrinkage and deformation of the products in processing and use.

Typical natural cellulosic fibers used in the present invention include grass fibers, wood fibers, chopped straw, chopped corn straw, bagasse, chopped leaves, chopped corn husks, hemp fibers, and other root, stem, and leaf cellulosic fiber made of crude natural plants and their derivatives, or mixtures thereof. Pretreatment of natural cellulosic fibers is usually necessary in most cases. Such pretreatment includes cleaning, drying, grinding, coloring, or purification treatment by some suitable additives to render the composition edible. The fibers final dimension is preferably in the range from about 40 to 100 mesh.

The typical dietary fibers used in the present invention include both soluble and insoluble fibers. Insoluble fibers, such as wheat bran, soluble fibers, such as those from vegetables, fruits, and some grains, such as oats and barley. Among the different sources of dietary fiber as fecal bulking agents, wheat bran is probably the most studied and among the most effective.

The major physiological benefits of natural crude fiber used in the present invention is the useful role of promoting regularity and preventing constipation and its protective effect against colon and cancers.

Hygiene additives used in the protein-based compositions of the present invention include anti-tartar agents and fresheners to help keep the animal pet's teeth and bones strong and to promote good oral hygiene. Hygiene additives can include calcium pyrophosphate, sodium tripolyphosphate, zinc citrate, and calcium hydrogen phosphate as cleaning abrasives to help cleaning animal pet teeth. Hygiene additives also include fresheners, such as dementholized peppermint oil, spearmint oil, sorbitol, and sorbitan. Preservatives are often necessary in foods. Dog food manufacturers use several antioxidants to prevent degradation of fat-soluble vitamins and to prevent spoiling of foods. Commonly used preservatives include butylated hydroxy anisole (BHA), butylated hydroxy toluene (BHT), ethoxyquin (6-ethoxy-1,2-dihydro-2,2,4-trimethylquinoline), and vitamins C and E. BHA and BHT are often used in concert, and they are generally recognized as safe (GRAS) by United States Food and Drug Administration. Ethoxyquin is an antioxidant manufactured by Monsanto Chemical Company used in dog food for many years in the United States, but it is banned in Europe. Preservatives used in connection with the present invention can also include bactericides, such as calcium propionate, sorbic acid, potassium sorbate, lactic acid, benzoic acid, sodium benzoate, ethyl-p-hydroxybenzoate, and propyl-p-hydroxybenzoate.

Water exists in all natural biopolymers. Water functions as a plasticizer during the mixing and processing of ingredients. An effective amount of water is preferably included in the protein-based compositions within the scope of the present invention to improve the processing flowability of the composition. The water content of the present invention composition is preferably adjusted from about 15 to 35 wt. %. Most of the water content is removed during processing and molding of the article, and then the product is dried. The final molded article preferably contains from 8 to 15 wt. % water. Too much moisture without preservatives causes the dog chew or pet toy to mildew and rot.

Other plasticizers can be used as processing aids. Such plasticizers improve the processing flowability of, and they enhance flexibility of the articles made from, the protein-based thermoplastic compositions of the present invention. An effective amount of plasticizer is preferably used, ranging from about 5 to 30 wt. %. The plasticizers are preferably edible and chemically compatible with the protein-based compositions within the scope of the present invention. Typical edible plasticizers which can be used in the present invention include glycerol, sorbitan, ethylene glycol, propylene glycol, diethylene glycol, dipropylene glycol, mannitol, and sorbitol.

Flavorings are preferably included in the protein-based molding compositions to provide a flavor and odor which attracts and entices the dog or pet. The flavoring ingredients are preferably distributed throughout the molding composition so that the attractive odor or flavor remains throughout the life of the chewable pet toy or artificial dog bone. Typical flavorings which can be used in accordance with the present invention include plant and animal flavors such as garlic powder, salt, onion powder, plant oils, such as corn oil and peanut oil, and natural animal meat and animal products, such as beef hide, pork skin, chicken meat and fat, beef meat and fat, pork meat and fat, and dried meat floss.

Modifiers can be used to enhance the mechanical properties of present protein-based composition and also to improve the physical properties and processing properties. Typical modifiers which can be used in accordance with the present invention include pectin, carrageenan, carob gum, agar, mannan, and sodium alginate.

By carefully selecting edible, food-grade ingredients for the protein-based molding composition, the molded articles obtained from the molding composition can be edible. Moreover, the ingredients are preferably processed and handled in conformance with applicable food handling and sanitation laws and regulation.

The present invention protein-based molding composition can be easily shaped by injection molding, extrusion molding, transfer molding, and compression molding. The resulting molded articles, such as artificial dog bones and chewable pet toys, have excellent physical properties, tensile strength, flexibility, rigidity, and surface hardness, and they also can be edible and nutritious.

In preparing the protein-based molding compositions within the scope of the present invention, the ingredients are preferably mixed uniformly. The mixing can be carried out in various ways, such as simple blending at room temperature by use of an agitated blender or all the ingredients can be premixed in a high speed mixer. Further mixing and pelletizing can be performed in a co-rotating twin screw extruder with a rod die (L/D of 3:1). The twin screw extruder is preferably a multi-mode twin screw with co-rotation screw. All the ingredients also can be directly mixed in the twin screw extruder. The ingredients are fed into the extruder from individual hoppers in predetermined sections of the twin screw extruder.

The processing conditions can be varied as necessary to achieve effective mixing and to form homogeneous pellets. For instance, the temperature distribution along the extruder, pressure, screw speed and configuration, feed rate of the ingredient, and throughput rate vary. An example of a suitable mixing twin screw extruder is a co-rotating twin screw extruder sold as the Leistritz Micro-18. The moisture content of pellets may be adjusted by drying for later use. The water content of pellets is preferably from about 10 to 35 wt. %.

After mixing and pelletizing, the molding composition is preferably processed into a molded article, such as an artificial dog bone or chewable pet toy, by injection molding. In present invention, a useful injection machine is Boy 80M, Boy Machines, Inc. Screw diameter 48 mm, screw-LD ratio 17, maximum injection weight (with polystyrene) 234 g. During the injection, the solid pellets are heated to a molten state, having a water content from about 10 to 30 wt. %, plasticizer content from 0 to 25 wt. %, protein content from 50 to 70 wt. %. The composition is injected into the mold of a dog chew or chewable pet toy and a standard ASTM testing bar.

The currently preferred injection pressure is from about 860 to 1200 MPa. The injection processing temperature profile was: zone 1 (hopper)/zone 2/zone 3/zone 4/zone 5 (nozzle)=25/85/120–125/120–135/120–135° C. The mold temperature was between 25 and 40° C., the mean cycle time was about 1 to 2 minutes, and the injection time was 0.8 second.

The present invention composition may be molded to provide solid articles of varying shapes, sizes, and dimensions that could be desired for a variety of applications. The molded articles possess a high tensile strength, in the range from about 20 to 40 MPa, good flexibility, high rigidity, surface hardness, and good water resistance. The water absorption is from about 80 to 250 wt. %, so that the article remains structurally intact for a few days upon exposure to water.

The present composition contains various ingredients, including nutrients and hygiene additives that help keep teeth and bones strong, encourage oral hygiene, and promote the growth and health of dogs and pets.

The invention will be further described by reference to the following detailed examples. These examples are not meant to limit the scope of the invention that has been set forth in the foregoing descriptions. The disclosure of the cited references are incorporated by reference herein. In the following examples, compositions within the scope of the present invention were molded into a standard testing bar as described in the American Society for Testing and Materials (ASTM D 638-86). Tensile properties of the molded articles were tested according to ASTM Standard method D638-86 using an Instron Universal Testing System (Model 4465). Percent water absorption was measured according to ASTM D570-81 procedure.

EXAMPLE 1

The Relationship Between Plasticizers and Moisture Content in Injection Molding of Soy Protein Isolate In this example, edible plasticizers and water were used to improve the processing flowability of soy protein. The major soybean protein is one globular molecule which normally is compactly folded, having an interior hydrophobic region and an exterior hydrophilic region. The water and plasticizers function to unfold the soybean protein by disrupting the hydrophilic region and exposing the hydrophobic region. This is possible because water and water soluble plasticizers, such as polyhydric alcohols, can form hydrogen bonds between the hydrophobic and hydrophilic regions.

Figure 2:
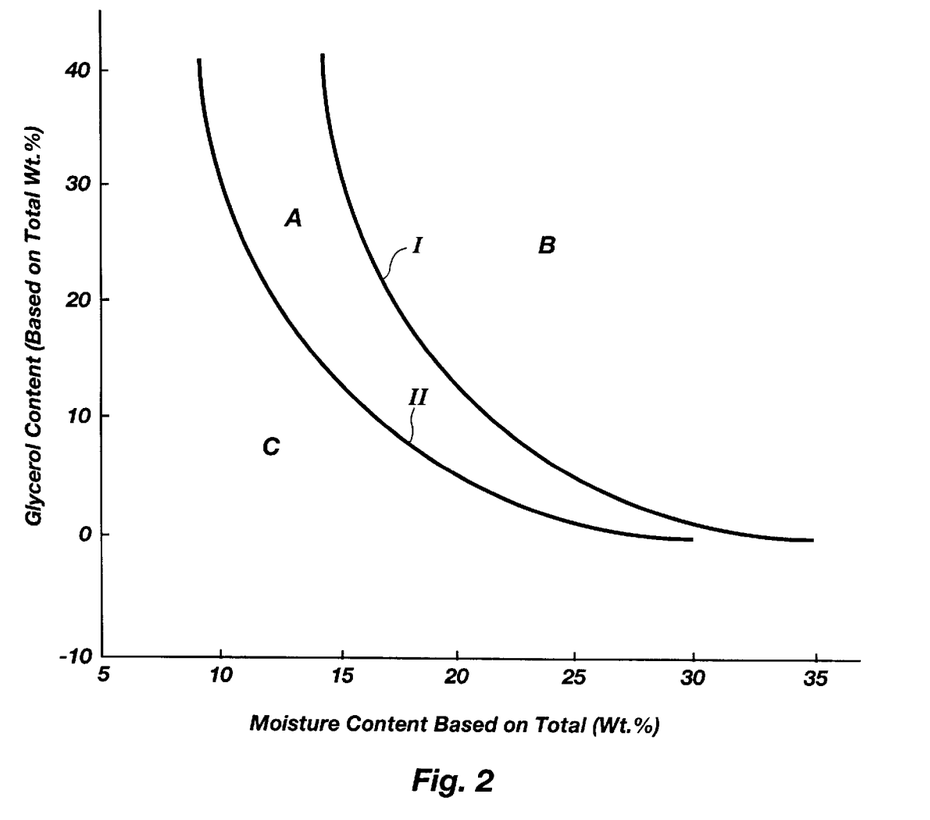
FIG. 2 is a graph showing the relationship between glycerol plasticizer content and water content in injection molding of soy protein isolate.

FIG. 2 shows the relationship between glycerol plasticizer content and water content in injection molding of soy protein isolate. Curves I and II define regions A, B, and C. In region B, the soy protein isolate composition was easy to flow in injection molding processing conditions. In region C, the soy protein isolate composition was hard to flow and showed thermoset behavior. In region A, the soy protein isolate composition flowed better and showed thermoplastic behavior. From FIG. 2, adding too much glycerol to water may weaken the unfolding polypeptide action of water. Preferred ratios of plasticizer, such as glycerol, and water in injection molding applications can be seen from FIG. 2. It is currently believed that the relationship between plasticizer and water in injection molding of soy protein isolate can be extended to animal derived proteins.

In this example, the injection machine was Boy 80M, Boy Machines, Inc., with a screw diameter of 48 mm and a screw-LD ratio of 17. The injection pressure was from about 860 to 1200 MPa. The injection processing temperature profile was: zone 1 (hopper)/zone 2/zone 3/zone 4/zone 5 (nozzle)=25/85/125/135/135° C. The mold temperature was between 25 and 40° C., and the injection time was 0.8 second.

EXAMPLE 2

The Effect of Animal Derived Protein on the Mechanical Properties of Soy Protein Isolate Composition in Dow Chews In this example, the ingredients were premixed together in a high speed mixer (Henschel Mixers America, Inc., FM10 heater mixers) at room temperature, mixer speed 1800 rpm for 6 to 8 minutes. The ingredients were further processed by a Leistritz Micro-18 co-rotating twin screw extruder having six barrel zones having the following temperature profile: zone 1/zone 2/zone 3/zone 4/zone 5/zone 6=95/100/105/110/-105/98° C. The die temperature was 87° C., and the screw speed was 180 rpm. The die pressure was 345 to 605 psi. After the extrudate was granulated, the moisture content of the granules was measured by a moisture analyzer (Ohaus model MB 200) at 130° C. for 30 minutes. The moisture content of the granules was between 31 and 36 wt. %. The granules were processed into ASTM standard testing bar by a compression mold machine, Model B 3710—ASTM, Carver, Inc., at 130° C., 10 tons force for 10 minutes. The ASTM standard testing bar was tested according to the American Society for Testing and Materials (ASTM D 638-86). The results are shown in Table 1.

Table 1 shows the effects of the animal derived protein on the mechanical properties of plant derived soy protein isolate composition. The mechanical properties of soy protein isolate, such as tensile strength and elongation were enhanced substantially and Young's Modulus was decreased due to the added gelatin or casein. The strength and flexibility of molded articles was improved by compounding plant derived protein with animal derived protein.

In the present invention, the plant derived protein composition can be formulated with about 10 to 50 wt. % animal derived protein, and preferably from about 10 to 30 wt. % animal derived protein. The protein-based compositions show thermoplastic flowability using water as the main plasticizer.

TABLE 1

| | Sample No. | | |
|---|---|---|---|
| | 1 | 2 | 3 |
| Ingredients[1] | | | |
| Soy protein isolate[2] | 100 | 100 | 100 |
| Animal derived protein | 0 | 20[3] | 20[4] |
| Glycerol[5] | 8 | 8 | 2 |
| Garlic Powder[6] | 2 | 2 | 2 |
| Onion Powder[7] | 2 | 2 | 2 |
| NaCl[8] | 1 | 1 | 1 |
| Calcium Propionate[9] | 0.5 | 0.5 | 0.5 |
| Potassium Sorbate[10] | 0.05 | 0.05 | 0.05 |
| $H_2O$ | 80 | 80 | 80 |
| Mechanical Properties | | | |
| Moisture Content (wt. %) | 11.1 | 12.0 | 11.1 |
| Tensile Strength (MPa) | 12.9 | 13.4 | 15.7 |
| Elongation (%) | 3.31 | 36.18 | 5.72 |
| Young's Modulus (MPa) | 1522 | 900 | 1184 |
| Processing Conditions | | | |
| T die (° C.) | 87 | 87 | 87 |
| Screw speed (rpm) | 180 | 180 | 180 |
| Feeder rate | 33 | 39 | 39 |
| Die pressure (psi) | 605 | 200 | 345 |

[1]Ingredients are by part based on soy protein isolate as 100 parts.
[2]Soy protein: SUPRO ® 500E, isolate soy protein, Protein Technologies International.
[3]Gelatin: Type A, approximately 300 Bloom from porcine skin, SIGMA Chemical Co.
[4]Casein: from bovine milk, approximately 90% protein (biuret) and 0.2% lactose. SIGMA Chemical Co.
[5]Glycerol: 99.7% glycerine, USP, Dow Chemical Company.
[6]Garlic powder: Heart-Loc for restaurant use, Spice Adrice
[7]Onion powder: Heart-Loc for restaurant use, Spice Adrice
[8]Socium Chloride: Iodized salt, Morton International, Inc.
[9]Calcium propionate: calcium propionate 97%, Aldrich Chemical Company, Inc.
[10]Potassium sorbate: TS/VG 12250, Wego Chemical & Mineral Corp.

EXAMPLE 3

The Effect of Animal Derived Protein on the Mechanical Properties of Soy Protein Isolate Composition Various soy protein isolate compositions were prepared in accordance with the procedure Example 2, yet having the ingredient concentrations set forth in Tables 2 and 3. Table 2 shows the effect of various gelatin concentrations on the mechanical properties of soy protein isolate composition. Table 3 shows the effect of various casein concentrations on the mechanical properties of soy protein isolate composition. The mechanical properties of tensile strength, elongation, and Young's Modulus, were enhanced with increased gelatin and casein content. The molded articles prepared from the soy protein isolate compositions showed good rigidity, strength, and stability.

TABLE 2

| | Sample No. | | | |
|---|---|---|---|---|
| | 1 | 2 | 3 | 4 |
| Ingredients[1] | | | | |
| Soy protein isolate[2] | 100 | 100 | 100 | 100 |
| Gelatin[3] | 0 | 25 | 50 | 75 |
| $H_2O$ | 100 | 100 | 100 | 100 |
| Mechanical Properties | | | | |
| Moisture Content (wt. %) | 12.9 | 14.0 | 15.0 | 16.0 |
| Tensile Strength (MPa) | 12.7 | 29.8 | 30.1 | 25.0 |

TABLE 2-continued

| | Sample No. | | | |
|---|---|---|---|---|
| | 1 | 2 | 3 | 4 |
| Elongation (%) | 0.93 | 1.38 | 3.78 | 2.31 |
| Young's Modulus (MPa) | 2432 | 4275 | 4253 | 2460 |

[1]Ingredients are by part based on soy protein isolate as 100 parts.
[2]Soy protein: SUPRO ® 500E, isolate soy protein, Protein Technologies International.
[3]Gelatin: Type A, approximately 300 Bloom from porcine skin, SIGMA Chemical Co.

TABLE 3

| | Sample No. | | | |
|---|---|---|---|---|
| | 1 | 2 | 3 | 4 |
| Ingredients[1] | | | | |
| Soy protein isolate | 100 | 100 | 100 | 100 |
| Casein[2] | 0 | 25 | 50 | 75 |
| $H_2O$ | 100 | 100 | 100 | 100 |
| Mechanical Properties | | | | |
| Moisture Content (wt. %) | 12.9 | 14.0 | 14.1 | 13.6 |
| Tensile Strength (MPa) | 12.7 | 16.8 | 19.3 | 25.3 |
| Elongation (%) | 0.93 | 1.82 | 1.60 | 2.84 |
| Young's Modulus (MPa) | 2432 | 2448 | 2081 | 3003 |

[1]Ingredients are same as in Table 2.
[2]Casein: from bovine milk, approximately 90% protein (biuret) and 0.2% lactose. SIGMA Chemical Co.

TABLE 4A

| | Sample No. | | | |
|---|---|---|---|---|
| | 1 | 2 | 3 | 4 |
| Ingredients[1] | | | | |
| Soy protein isolate[2] | 100 | 100 | 100 | 100 |
| Gelatin[3] | 20 | 20 | 20 | 20 |
| Glycerol[4] | 5 | 5 | 5 | 5 |
| Dietary Fiber[5] | 0 | 5 | 10 | 20 |
| $H_2O$ | 80 | 80 | 80 | 80 |
| Mechanical Properties | | | | |
| Moisture Content (wt. %) | 12.0 | 14.0 | 13.1 | 12.9 |
| Tensile Strength (MPa) | 30.6 | 25.7 | 21.4 | 19.7 |
| Elongation (%) | 4.19 | 4.02 | 3.82 | 2.31 |
| Young's Modulus (MPa) | 3152 | 1930 | 1080 | 1780 |

[1]Ingredients are by part based on soy protein isolate as 100 parts.
[2]Soy protein: SUPRO ® 500E, isolate soy protein, Protein Technologies International.
[3]Gelatin: Type A, approximately 300 Bloom from porcine skin, SIGMA Chemical Co.
[4]Glycerol: 99.7% glycerine, USP, Liq, Witco Corporation.
[5]Dietary Fiber: purified powdered cellulose, International Filler Corporation. Grade HS40FCC, 100 Microns.

The compositions of this Example were processed in the same manner as in Example 2, above. Table 4A shows that the mechanical properties of tensile strength, Young's modulus, and elongation, were decreased with the increasing content of purified powdered dietary cellulose fiber. Table 4A also shows that the protein based composition can contain about 0 to 15 wt. % dietary fiber, and preferably between 0 and 5 wt. %.

TABLE 4B

| | Sample No. | | | | | | |
|---|---|---|---|---|---|---|---|
| Ingredients[1] | 1 | 2 | 3 | 4 | 5 | 6 | 7 |
| Soy protein isolate[2] | 100 | 100 | 100 | 100 | 100 | 100 | 100 |
| Gelatin[3] | 20 | 20 | 20 | 20 | 20 | 20 | 20 |
| Glycerol[4] | 5 | 5 | 5 | 5 | 5 | 5 | 5 |
| Dietary Fiber | 0 | 10[5a] | 10[5b] | 0 | 0 | 10[5a] | 10[5a] |
| $H_2O$ | 80 | 80 | 80 | 80 | 80 | 80 | 80 |
| Mechanical Properties | | | | | | | |
| Moisture Content (wt. %) | 14.2 | 12.0 | 13.9 | 16.0 | 11.0 | 15.0 | 12.0 |
| Tensile Strength (MPa) | 19.1 | 14.8 | 18.1 | 19.5 | 35.5 | 24.9 | 38.1 |
| Elongation (%) | 1.4 | 2.1 | 2.2 | 22.9 | 1.1 | 4.2 | 0.9 |
| Young's Modulus (MPa) | 1339 | 1010 | 1327 | 1812 | 2948 | 2296 | 3108 |

[1]Ingredients are by part based on soy protein isolate as 100 parts.
[2]Soy protein: Samples 1–4: SUPRO ® 500E, Isolate Soy Protein, Protein Technologies International; sample 5: Isolate Soy Protein No. 066-0646, Archer Daniels Midland Company.
[3]Gelatin: 250 Bloom, Dynagel, Inc.
[4]Glycerol: 99.7% glycerine, USP, LIQ, Witco Corporation.
[5]Dietary Fiber: purified powdered cellulose, International Filler Corporation. Grade HS40FCC, 100 microns
[5b]Dietary Fiber: purified powdered cellulose, International Filler Corporation. Grade BH65FCC, 50 microns.

EXAMPLE 4

The Effect of Dietary Fiber on Mechanical Properties of Protein-based Compositions The dietary fibers can change the physical properties of molded articles. In addition, they have special physiological functions of promoting regularity and preventing constipation. Dietary fiber is also believed to protect against colon and other cancers.

The compositions of this example were processed in the same manner as in Example 5. In Table 4B, the results of samples 1 to 3 show the effect of dietary fiber size on mechanical properties of protein based compositions. The tensile strength and Young's modulus were decreased. The elongation was increased with added dietary fiber content. Longer dietary fiber (100 microns) had a larger effect on the mechanical properties of the protein based composition than short dietary fibers (50 microns).

The results of samples 4–7 show another effect of dietary fiber on the mechanical properties of protein based compositions. The tensile strength and Young's modulus were increased. The elongation was decreased with added dietary fiber (100 micron). The soy protein isolate in samples 1 to 3 was SUPRO® 500E which has high viscosity, solubility, and forms heat stable emulsions. SUPRO® 500E soy protein isolate has a pH from 6.9 to 7.3. The soy protein isolate in samples 4–7 was No. 066-646 from Archer Daniels Midland Company. This soy protein isolate has a medium low viscosity and a pH from 6.3 to 6.7. Thus, the choice of soy protein isolate also affects the mechanical properties of the resulting composition. It was observed that purified powdered cellulose is a better reinforcer and can enhance physical properties of molded articles prepared.

In samples 4–7, the results show the effect of moisture content on mechanical properties of protein-based compositions. Sample 4 has the same formulation as Sample 5, and sample 6 has the same formulation as Sample 7. The results show that the tensile strength and Young's Modulus were enhanced with a dryer composition. The elongation was decreased with decreasing moisture content of the molded sample.

EXAMPLE 5

The Mechanical Properties of Dog Chews or Chewable Net Toys of Protein-based Composition in Injection Molding In this example, the ingredients were premixed together in a high speed mixer (Henschel Mixers America, Inc., FM10 heater mixers) at room temperature, mixer speed 1800 rpm for 6 to 8 minutes. The ingredients were further processed by a Leistritz Micro-18 co-rotating twin screw extruder. It had six barrel zones with a rod die and the following temperature profile: zone 1/zone 2/zone 3/zone 4/zone 5/zone 6=95/100/105/110/105/95° C. The die pressure was about 160 to 410 psi. After the extrudate was granulated, the moisture content of the granules was measured by a moisture analyzer (Ohaus model MB200) at 130° C. for 30 minutes. The moisture content of the granules was 25–30%.

The granules were processed into an ASTM standard testing bar by an injection mold machine, Boy 80M, Boy Machine, Inc., having a screw diameter of 48 m/m and a screw LD ratio of 17. The injection processing screw speed was 36 rpm, and the injection pressure was from 540 to 680 MPa. The injection temperature profile was zone l(hopper)/zone 2/zone 3/zone 4 (nozzle)=25/85/125/135/135° C. The mold temperature was from 25 to 40° C. The injection speed was 0.8 seconds. The experimental results are reported below in Table 5.

TABLE 5

| | Sample No. | | |
|---|---|---|---|
| | 1 | 2 | 3 |
| Ingredients[1] | | | |
| Plant derived protein[2] | 100 | 100 | 100 |
| Animal derived protein[3] | 25 | 25 | 25 |
| Glycerol[4] | 8 | 8 | 8 |
| Dietary Fiber[5] | 2.5 | 2.5 | 2.5 |
| Garlic Powder[6] | 2 | 2 | 2 |
| Onion Powder[7] | 2 | 2 | |
| Calcium Propionate[8] | 0.5 | 0.5 | 0.5 |
| Tricalcium Phosphate[9] | 1.25 | 1.25 | 1.25 |
| Calcium Carbonate[10] | 0.5 | 0.5 | 0.5 |
| L-Lysine Monohydrochloride[11] | 0.2 | 0.2 | 0.2 |
| L-Ascorbic Acid[12] | 0.02 | 0.02 | 0.02 |
| Potassium Sorbate[13] | 0.05 | 0.05 | 0.05 |
| Mechanical Properties | | | |
| Moisture Content (wt. %) | 12.1 | 11.0 | 13.0 |
| Tensile Strength (MPa) | 20.3 | 26.3 | 17.9 |
| Elongation (%) | 3.22 | 2.68 | 3.55 |
| Young's Modulus (MPa) | 1844 | 2629 | 1857 |

[1]Ingredients are by parts based on plant derived protein as 100 parts.
[2]Sample 1 of plant derived protein is Soy Protein Isolate SUPRA ® 500E, Protein Technologies International, Sample 2 of plant derived protein is soy protein concentrate Profine ® VF., Central Soya Company, Inc., the sample 3 is 50 wt. % Soy Protein Isolate 500E and 50 wt. % wheat Gluten (Gluvital 21000, 78.0% minimum protein, Cerestar USA, Inc.) of total plant derived protein.
[3]Gelatin: 250 Bloom, gelatin, Dynagel Inc.
[4]Glycerol: 99.7 Content Glycerine, USP.LIQ, Witco Corporation.
[5]Dietary Fiber: purified powdered cellulose, International Filler Corporation, grade HS40 FCC, 100 microns.
[6]Garlic Powder: Heart-Loc for restaurant use, Spice Adrice.
[7]Onion Powder: Heart-Loc for restaurant use, Spice Adrice.
[8]Calcium Propionate: Ashland Chemical Company.
[9]Tricalcium Phosphate: Food Grade Powder, FWC Corporation Chemical Products Group.
[10]Calcium Carbonate: Food grade FCC, Specialty Minerals, Inc.
[11]L-Lysine monohydrochloride: SIGMA Chemical Co.
[12]L-Ascorbic Acid: WEGO Chemical & Mineral Corporation.
[13]Potassium Sorbate; Ashland Chemical Company.

Table 5 shows that protein based compositions of the present invention can include protein derived from plant combined with animal derived protein. The protein derived from plant is preferably soy protein isolate, or soy protein concentration. The plant derived protein can be soy protein isolate combined with other protein derived from plant, such as wheat gluten. The testing results show that the protein based composition in the present invention has good mechanical properties. When the plasticizer content was about 5.0 wt. % based on total weight composition, the tensile strength of the injection molded specimen was improved (about 18 to 26 MPa), the Young's modulus and elongation were also better. The injection molded specimen also showed better rigidity.

EXAMPLE 6

The Nutritional, Oral Hygiene, Durability Evaluation of Dog Chews and Chewable Pet Toys Prepared from Protein-based Compositions The protein based compositions within the scope of the present invention have excellent nutrition and digestibility. Proteins are made up of amino acids. Although dogs can manufacture some amino acids in their bodies, most amino acids must be supplied in the dog's food. Protein from animal sources, such as meat and meat by-products, are more complete and easier to extract and digest. The protein from plant sources has much the same nutrition as protein from animal sources.

The soy proteins used in present invention have sometimes been associated with allergic reaction in companion animals. The two antigens most frequently identified with allergic responses to soy protein are the storage proteins glycinin and beta-conglycinin. Currently the levels of these antigens can be reduced by 99.99% to undetectable levels. For example, Central Soya's Profine® II and Profine® VF are both processed to this low antigenicity level.

Trypsin inhibitors, present in many protein sources including soy proteins, inhibit the important digestive enzymes trypsin and chymotrypsin. When these enzymes are inactivated, protein digestibility is reduced significantly. This is especially important in young animals who have low levels of trypsin activity. Exposure to heat significantly reduces trypsin inhibitor activity in soy protein, allowing for higher digestibility. For example soy flour, which is not treated, contains high levels of trypsin inhibitor which generally run between 15 and 20 (mg/g). The level of trypsin inhibitor in soy protein concentration can be reduced to contain trypsin inhibitor levels of less than 3 (mg/g), such as Central Soya's Profine® II and Profine® VF. Soy Protein isolate is a source of protein from plants that is highly digestible and excellent for food products. SUPRO® 500E is an isolated soy protein that provides texture and emulsion stability and excellent digestibility as show in Table 6.

TABLE 6

| Food Protein Source | Protein Digestibility (Corrected Amino Acid Score) |
|---|---|
| SUPRO ® 500E | 1.00 |
| Egg | 1.00 |
| Milk | 1.00 |
| Beet | 0.92 |
| Soy Protein Isolate | 0.92 |
| Oat (Flour) | 0.57 |
| Rice (Flour) | 0.54 |
| Corn (Flour) | 0.42 |
| Wheat Gluten | 0.27 |
| Collagen | 0.02 |

EXAMPLE 7

The Effect of Processing Temperature on the Mechanical Properties of Protein-based Compositions The compositions of this example were processed in the same manner as in Example 5. Table 7 shows the effect of the injection processing temperature profile on mechanical properties of. protein based compositions during injection molding. From the results reported in Table 7, one preferred injection processing temperature profile was zone 1 (hopper)/zone 2/zone 3/zone 4/zone 5 (nozzle)=25/85/125/130/125–130° C.

TABLE 7

| Ingredients[1] | | | | |
|---|---|---|---|---|
| Plant derived protein (500E) | | 100 | | |
| Animal derived protein | | 20 | | |
| Glycerol | | 5 | | |
| Dietary Fiber | | 0.8 | | |
| Garlic Powder | | 2 | | |
| Onion Powder | | 2 | | |
| Monocalcium Phosphate[2] | | 1 | | |
| Calcium Carbonate | | 1 | | |
| Vitamin D[3] | | 401U | | |
| L-Lysine Monohydrochloride | | 0.2 | | |
| H$_2$O | | 80 | | |
| | Sample | | | |
| | 1 | 2 | 3 | 4 |
| Mechanical Properties | | | | |
| Moisture Content (wt. %) | 14.1 | 14.0 | 14.0 | 13.0 |
| Tensile Strength (MPa) | 14.3 | 15.2 | 20.2 | 19.3 |
| Elongation (%) | 4.3 | 4.3 | 2.7 | 2.0 |
| Young's Modulus (MPa) | 1251 | 1190 | 1290 | 1278 |
| Injection Processing Temperature Profile | | | | |
| Zone 1 | 25 | 25 | 25 | 25 |
| Zone 2 | 85 | 85 | 85 | 85 |
| Zone 3 | 125 | 125 | 125 | 125 |
| Zone 4 | 120 | 125 | 130 | 130 |
| Zone 5 | 120 | 125 | 125 | 130 |

[1]Ingredients are by parts based on soy protein isolate as 100 parts. Ingredient sources are the same as those listed in Table 5, except for vitamin D and monocalcium phosphate.
[2]Monocalcium phosphate: Food grade powder, FWC Corporation, Chemical Products Group.
[3]Vitamin D: General Nutrition Corporation.

Nutritious and multifunctional dog chews and pet toys were prepared based upon the composition of Examples 5 and 7. The proteins used in the compositions consisted of plant derived protein, including soy protein isolate, soy protein concentrate, and a mixture of soy protein isolate and wheat gluten, and the animal derived protein gelatin.

The dog chews and pet toys described above were sufficiently hard to provide beneficial activity for the dogs' teeth and gums. It typically required a half hour or longer for the dogs to eat the dog chews. The chewing speed depended on the dog and the size of the dog chew. Based upon considerable testing, almost all dogs were interested in the dog chews and pet toys prepared in accordance with present invention.

Being protein based, the dog chews and chewable pet toys are rich in amino acids. The added flavorings were plant flavors, garlic powder and onion powder. Based upon observation, dogs like the flavored dog chews very much. The composition is abundant in added calcium and phosphorus minerals, Ca 0.6%, P 0.18%, and has Ca/P ratio of 3.4:1. L-lysine monohydrochloride, vitamin D, and L-ascorbic acid were added for their nutritional benefits. Potassium sorbate was added as a preservative. The dietary fiber was added to provide its major physiological benefits. The glycerol was added as a plasticizer and solvent for preservatives and insoluble ingredients.

As stated above, the protein based composition in Examples 5 and 7 is amino acid nutrition strengthened, not only have vitamins and minerals like calcium and phosphorus for strong teeth and bones; and also provide tooth cleaning.

The composition formulation can be varied to provide optimum and desired amounts and ratios of protein, vitamins, and minerals for optimum health, depending on the animal age and species. Hygiene additives, such as anti-tartar agents and fresheners, are also used in the protein-based compositions of the present invention to help clean animal pet teeth and freshen breath.

In summary, the protein based dog chew and pet toy compositions of the present invention are highly digestible and excellent dog food products. In addition, they promote clean, healthy teeth.

It will be appreciated that the present invention provides artificial dog bones and chewable pet toys which are durable, strong, improve oral hygiene, and provide nutritional value to the dog or pet.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A protein-based thermoplastic composition consisting essentially of:
   from above 70 to 86 wt. % protein, wherein said protein comprises a mixture of plant derived protein and animal derived protein;
   8 to 16 wt. % water;
   0.5 to 5 wt. % flavoring;
   0 to 5 wt. % edible plasticizer;
   0 to 15 wt. % fiber reinforcement;
   0 to 15 wt. % modifier;
   a nutrient or hygiene additive, said nutrient or hygiene additive being present in the composition at a concentration up to 5 wt. %; and
   wherein the composition, when molded, has a Young's Modulus in the range from 900 to 4000 MPa and a tensile strength in the range from 20 to 40 MPa.

2. The protein-based thermoplastic composition according to claim 1, wherein the plant derived protein is soybean protein selected from soy protein concentrate, soy protein isolate, and mixtures thereof.

3. The protein-based thermoplastic composition according to claim 1, wherein the plant derived protein is gluten, zein, hordein, avenin, kafirin, or a combination thereof.

4. The protein-based thermoplastic composition according to claim 1, wherein the animal derived protein is selected from casein, albumin, collagen, gelatin, keratin, and a combination thereof.

5. The protein-based thermoplastic composition according to claim 1, wherein the protein is a native protein or a chemically modified protein.

6. The protein-based thermoplastic composition according to claim 1, wherein the edible plasticizer is selected from glycerol, sorbitan, ethylene glycol, propylene glycol, diethylene glycol, dipropylene glycol, mannitol, sorbitol, and combinations thereof.

7. The protein-based thermoplastic composition according to claim 1, wherein the flavoring is selected from animal and plant flavors.

8. The protein-based thermoplastic composition according to claim 1, wherein the flavoring is an animal flavor selected from beef meat, beef fat, pork meat, pork fat, chicken meat, and chicken fat.

9. The protein-based thermoplastic composition according to claim 1, wherein the flavoring is a plant flavor selected from garlic powder, salt, onion powder, plant oil, and vegetable oil.

10. The protein-based thermoplastic composition according to claim 1, wherein the modifier is selected from pectin, carrageenan, carob gum, agar, mannan, and sodium alginate.

11. The protein-based thermoplastic composition according to claim 1, wherein the fiber reinforcement is selected from dietary fiber and natural cellulosic fiber.

12. The protein-based thermoplastic composition according to claim 1, further comprising a preservative selected from calcium propionate, sorbic acid, potassium sorbate, butylated hydroxy anisole (BHA), butylated hydroxy toluene (BHT), ethoxyquin, lactic acid, benzoic acid, sodium benzoate, ethyl-p-hydroxybenzoate, and propyl-p-hydroxybenzoate.

13. The protein-based thermoplastic composition according to claim 1, wherein the nutrient includes at least one vitamin selected from vitamin $A_1$, thiamine hydrochloride ($B_1$), riboflavin (vitamin $B_2$), nicotine acid, nicotinamide, L-ascorbic acid (vitamin C), tocopherol (vitamin E), cholecalciferol (vitamin $D_3$), vitamin $B_{12}$ folic acid (vitamin $B_6$), pyridoxine (vitamin $B_6$), menadione (vitamin K), and biotin (vitamin H).

14. The protein-based thermoplastic composition according to claim 1, wherein the nutrient includes at least one mineral selected from sodium, calcium, phosphorus, potassium, magnesium, iron, zinc, manganese, iodine, selenium and cobalt.

15. The protein-based thermoplastic composition according to claim 1, wherein the hygiene additive is selected from sodium tripolyphosphate, sodium hexametaphosphate, sodium dihydrogen phosphate, disodium hydrogen phosphate, sodium pyrophosphate, calcium carbonate, calcium phosphate (dibasic), calcium phosphate (tribasic), calcium gluconate, calcium lactate, sorbitol, sorbitan, pepsin, and bacillum subtilis proteinase.

16. The protein-based thermoplastic composition according to claim 1, wherein the composition, when molded, has a water absorption in the range from about 80 to 250 wt. %.

17. A chewable pet toy or artificial dog bone comprising the protein-based thermoplastic composition according to claim 1.

18. A chewable pet toy or artificial dog bone as defined in claim 17, configured to mimic a natural animal bone shape.

19. A chewable pet toy or artificial dog bone as defined in claim 17, prepared by injection molding, pressure molding, transfer molding, or extrusion molding.

20. The protein-based thermoplastic composition according to claim 1, wherein the protein further comprises microorganisms.

21. A protein-based thermoplastic composition according to claim 1, wherein the composition contains an edible plasticizer additive and a fiber reinforcement additive.

22. A protein-based thermoplastic composition consisting essentially of:
   from above 70 to 86 wt. % protein, wherein said protein comprises a mixture of plant derived protein and animal derived protein;
   8 to 16 wt. % water;
   0.5 to 5 wt. % flavoring;
   0 to 5 wt. % edible plasticizer;
   a fiber reinforcement additive, said fiber reinforcement additive being present in the composition at a concentration up to 15 wt. %;
   0 to 15 wt. % modifier;
   a nutrient or hygiene additive, said nutrient or hygiene additive being present in the composition at a concentration up to 5 wt. %; and
   wherein the composition, when molded, has a tensile strength in the range from 20 to 40 MPa.

23. A chewable pet toy or artificial dog bone comprising the protein-based thermoplastic composition according to claim 22.

* * * * *